(12) United States Patent
Deng

(10) Patent No.: US 11,732,644 B2
(45) Date of Patent: Aug. 22, 2023

(54) ORGANIC RANKINE CYCLE FOR COMBINED-CYCLE POWER PLANT

(71) Applicants: Mitsubishi Power Americas, Inc., Lake Mary, FL (US); Mitsubishi Power, Ltd., Yokohama (JP)

(72) Inventor: Shimin Deng, Oakville (CA)

(73) Assignees: Mitsubishi Power Americas, Inc., Lake Mary, FL (US); Mitsubishi Power, Ltd., Yokohama (JP)

( * ) Notice: Subject to any disclaimer, the term of this patent is extended or adjusted under 35 U.S.C. 154(b) by 131 days.

(21) Appl. No.: 17/252,177

(22) PCT Filed: Jun. 27, 2018

(86) PCT No.: PCT/US2018/039688
§ 371 (c)(1),
(2) Date: Dec. 14, 2020

(87) PCT Pub. No.: WO2020/005220
PCT Pub. Date: Jan. 2, 2020

(65) Prior Publication Data
US 2021/0254547 A1  Aug. 19, 2021

(51) Int. Cl.
*F02C 6/04* (2006.01)
*F01K 23/10* (2006.01)
(Continued)

(52) U.S. Cl.
CPC .............. *F02C 6/04* (2013.01); *F01K 23/10* (2013.01); *F02C 7/18* (2013.01); *F02C 7/22* (2013.01);
(Continued)

(58) Field of Classification Search
CPC ............. F02C 7/18; F02C 7/224; F01K 23/10
See application file for complete search history.

(56) References Cited

U.S. PATENT DOCUMENTS

| | | | | |
|---|---|---|---|---|
| 5,632,143 A | * | 5/1997 | Fisher ................. | F01K 23/10 60/39.181 |
| 6,367,258 B1 | * | 4/2002 | Wen ..................... | F02C 7/224 60/641.1 |

(Continued)

FOREIGN PATENT DOCUMENTS

| CN | 203822468 | 9/2014 |
|---|---|---|
| CN | 203822468 U | 9/2014 |

(Continued)

OTHER PUBLICATIONS

"International Application Serial No. PCT US2018 039688, International Search Report dated Jan. 10, 2019", 2 pgs.

(Continued)

*Primary Examiner* — Lorne E Meade
(74) *Attorney, Agent, or Firm* — Schwegman Lundberg & Woessner, P.A.

(57) ABSTRACT

A gas turbine combined-cycle power plant can comprise a gas turbine engine, a heat recovery steam generator, a steam turbine, a fuel regasification system and a Rankine Cycle system. The gas turbine engine can comprise a compressor for generating compressed air, a combustor that can receive a fuel and the compressed air to produce combustion gas, and a turbine for receiving the combustion gas and generating exhaust gas. The heat recovery steam generator is configured to generate steam from water utilizing the exhaust gas. The steam turbine is configured to produce power from steam from the heat recovery steam generator. The fuel regasification system is configured to convert the fuel from a liquid to a gas before entering the combustor. The Organic Rankine Cycle system is configured to cool compressed air extracted from the compressor to cool the gas turbine engine, and heat liquid fuel entering the fuel regasification system.

8 Claims, 6 Drawing Sheets

(51) Int. Cl.
  *F02C 7/18* (2006.01)
  *F02C 7/22* (2006.01)
  *F02C 7/224* (2006.01)
(52) U.S. Cl.
  CPC .......... *F02C 7/224* (2013.01); *F05D 2220/32* (2013.01); *F05D 2220/722* (2013.01); *F05D 2240/36* (2013.01); *F05D 2260/232* (2013.01)

(56) References Cited

U.S. PATENT DOCUMENTS

| | | | | |
|---|---|---|---|---|
| 6,571,548 | B1 * | 6/2003 | Bronicki | F01K 23/10 60/39.181 |
| 7,398,642 | B2 * | 7/2008 | McQuiggan | F02C 7/143 60/39.465 |
| 7,574,856 | B2 * | 8/2009 | Mak | F01K 23/10 60/645 |
| 7,900,451 | B2 * | 3/2011 | Amir | F01K 25/08 60/671 |
| 9,359,919 | B1 * | 6/2016 | Berry | F01K 25/103 |
| 10,100,739 | B2 * | 10/2018 | Kupratis | F02C 7/143 |
| 2003/0005698 | A1 * | 1/2003 | Keller | F01K 23/10 60/643 |
| 2008/0190106 | A1 | 8/2008 | Mak | |
| 2013/0028365 | A1 * | 1/2013 | Tatli | G21C 19/08 376/272 |
| 2016/0341126 | A1 * | 11/2016 | Kupratis | F02C 7/143 |

FOREIGN PATENT DOCUMENTS

| | | |
|---|---|---|
| CN | 106103913 A | 11/2016 |
| CN | 106133279 A | 11/2016 |
| JP | H0688538 | 3/1994 |
| JP | H10288047 | 10/1998 |
| JP | 2015113725 | 6/2015 |
| JP | 2015183590 A | 10/2015 |
| JP | 6337213 | 5/2018 |
| KR | 20180005289 | 1/2018 |
| KR | 20217002771 | 9/2022 |
| TW | 202001074 | 1/2020 |
| TW | 202001074 A | 1/2020 |
| WO | 2015183597 | 12/2015 |
| WO | WO-2015183597 A1 | 12/2015 |
| WO | 2018078688 | 5/2018 |
| WO | 2020005220 | 1/2020 |
| WO | WO-2020005220 A1 | 1/2020 |

OTHER PUBLICATIONS

"International Application Serial No. PCT US2018 039688, Written Opinion dated Jan. 10, 2019", 4 pgs.

"International Application Serial No. PCT US2018 039688, International Preliminary Report on Patentability dated Jan. 7, 2021", 6 pgs.

"Japanese Application Serial No. 2020-572798, Notification of Reasons for Refusal dated Nov. 24, 2021", w English Translation, 15 pgs.

"Korean Application Serial No. 10-2021-7002771, Notice of Preliminary Refusal dated Dec. 23, 2021", w English Translation, 23 pgs.

"Japanese Application Serial No. 2020-572798, Response filed Apr. 25, 2022 to Notification of Reasons for Refusal dated Nov. 24, 2021", w/ English translation, 15 pgs.

"Korean Application Serial No. 10-2021-7002771, Final Office Action dated May 27, 2022", W/English Translation, 9 pgs.

"Korean Application Serial No. 10-2021-7002771, Response filed Feb. 23, 2022 to Notice of Preliminary Refusal dated Dec. 23, 2021", w/English translation, 37 pgs.

"Korean Application Serial No. 10-2021-7002771, Response filed Aug. 30, 2022 to Final Office Action dated May 27, 2022", w/ English Claims, 16 pgs.

"Taiwanese Application Serial No. 108107978, Office Action dated Jul. 14, 2022", w/ English translation, 11 pgs.

"Taiwanese Application Serial No. 108107978, Response filed Sep. 15, 2022 to Office Action dated Jul. 14, 2022", w/ English claims, 26 pgs.

* cited by examiner

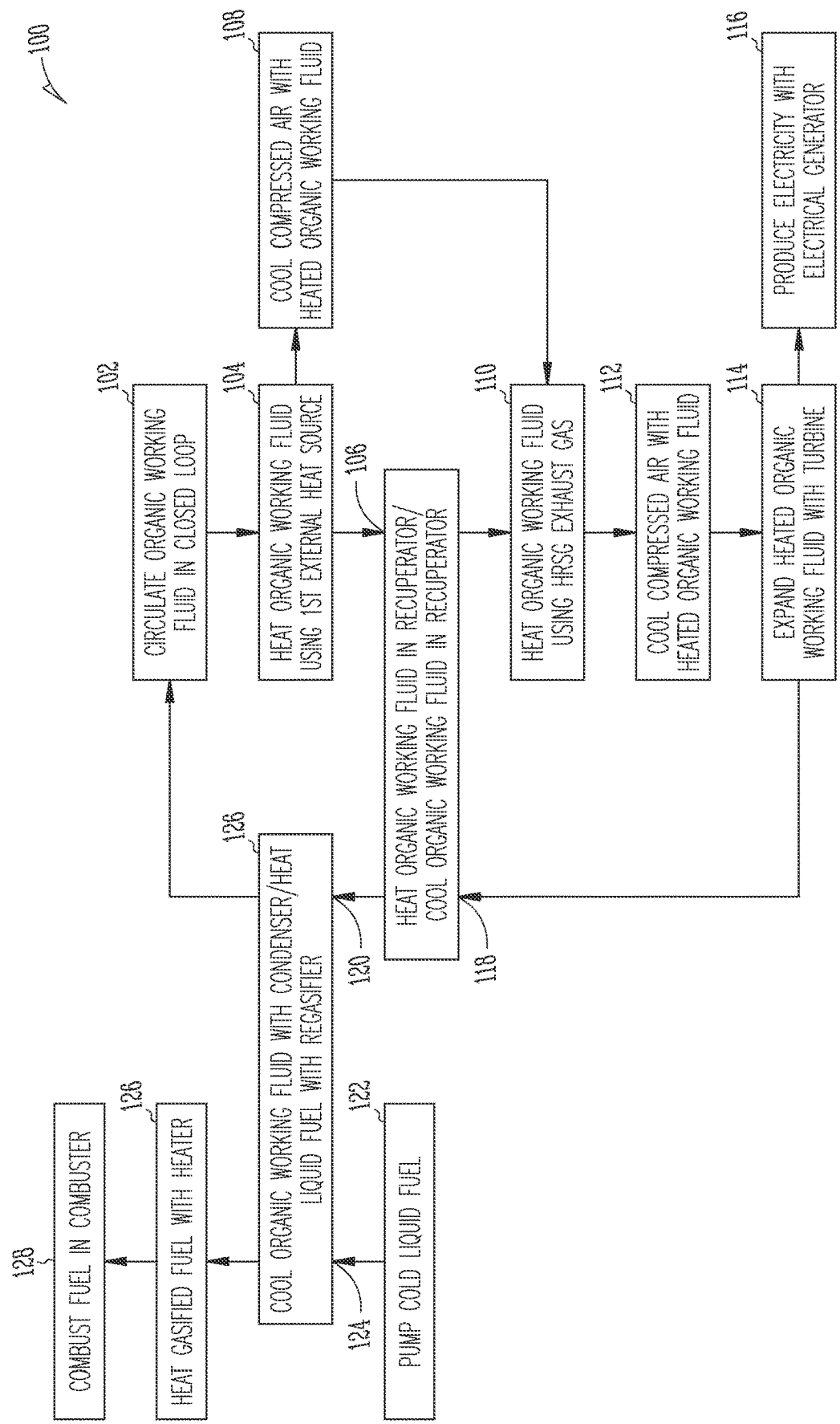

ORGANIC RANKINE CYCLE FOR COMBINED-CYCLE POWER PLANT

RELATED APPLICATIONS

This application is a U.S. National Stage Filing under 35 U.S.C. 371 from International Patent Application Serial No. PCT/US2018/039688, filed Jun. 27, 2018, published as WO 2020/005220 A1 on Jan. 2, 2020, the content of which is incorporated herein by reference in its entirety.

TECHNICAL FIELD

This document pertains generally, but not by way of limitation, to combined-cycle power plants utilizing a gas turbine engine, a heat recovery steam generator, and a steam turbine. More specifically, but not by way of limitation, the present application relates to systems for cooling compressor air extracted from the gas turbine, which can be used to cool other portions of the combined-cycle power plant system. This document also pertains to liquefied natural gas cold energy utilization.

BACKGROUND

For a gas turbine combined-cycle (GTCC) power plant with advanced gas turbines, such as J-series engines, cooling air extracted from the compressor section is typically cooled in coolers using heat exchangers before sending the cooling air to the turbine section and/or the combustor of the gas turbine. For example, a Turbine Cooling Air (TCA) cooler and an Enhanced Cooling Air (ECA) cooler are typically used wherein the extracted compressor air is cooled by high pressure (IV) feedwater from a heat recovery steam generator (HRSG). HP feedwater heated by the hot extracted compressor air can be used to increase intermediate pressure (IP) and low pressure (LP) steam production in the HRSG.

Natural gas is frequently used in GTCC power plants as the fuel for the gas turbine engines. Natural gas is the second largest source of energy globally and is expected to remain in that position for the foreseeable future. A major component of the natural gas market is liquefied natural gas (LNG) which is used to transport natural gas worldwide. Typically, LNG is currently re-gasified through open rack vaporizers using heat from seawater at receiving terminals where the LNG is received. The regassification process results in localized cooling of the seawater, which presents environmental challenges including negative impacts on marine life.

Examples of combined-cycle power plants with LNG cold energy utilization are described in U.S. Pat. No. 6,367,258 to Wen et al.; U.S. Pat. No. 7,398,642 to McQuiggan; U.S. Pat. No. 7,900,451 to Amir et al.; and U.S. Pub. No. 2003/0005698 to Keller.

OVERVIEW

The present inventor has recognized, among other things, that problems to be solved in GTCC power plants can include inefficient energy utilization of the TCA and ECA cooling systems, as well as the inherent cold energy from LNG not being utilized. For example, the HP feedwater can only be heated to a certain temperature due to limitations of typical HRSG operation that would cause the feedwater to vaporize. This temperature limitation inhibits the effectiveness of the TCA and the ECA. Also, a significant amount of energy is consumed to cool and liquefy the natural gas for producing the low-temperature LNG (about −160° C.). The inherent cold energy/exergy available from the low-temperature LNG is not being utilized during regasification.

The present subject matter can help provide a solution to this problem and other problems, such as by using an Organic Rankine Cycle (ORC) to utilize gas turbine cooling air as a heat source and LNG as a cold sink. By increasing heat absorption temperature and decreasing heat releasing temperature, a significant improvement on power cycle performance can be achieved.

In an example, a gas turbine combined-cycle power plant can comprise a gas turbine engine, a heat recovery steam generator, a steam turbine, a fuel regasification system and an Organic Rankine Cycle system. The gas turbine engine can comprise a compressor for generating compressed air, a combustor that can receive a fuel and the compressed air to produce combustion gas, and a turbine for receiving the combustion gas and generating exhaust gas. The heat recovery steam generator can be configured to generate steam from water utilizing the exhaust gas. The steam turbine can be configured to produce power from steam from the heat recovery steam generator. The fuel regasification system can be configured to convert the fuel from a liquid to a gas before entering the combustor. The Organic Rankine Cycle system can be configured to cool compressed air extracted from the compressor to cool the turbine and the combustor, and heat liquid fuel entering the fuel regasification system.

In another example, an Organic Rankine Cycle system for operation with a gas turbine combined-cycle power plant comprises a fluid pump for pumping a fluid, a heater for heating the fluid pumped by the fluid pump, a turbine for expanding the fluid heated in the heater, a first heat exchanger positioned between the heater and an inlet of the turbine to heat the fluid with compressed air extracted from a compressor of the gas turbine combined-cycle power plant, and a regasification system for a fuel configured to cool the fluid between an outlet of the turbine and an inlet of the pump.

In an additional example, a method of operating a gas turbine combined-cycle power plant comprises circulating a working fluid through a closed loop using a working pump, heating the working fluid with a first external heat source, cooling compressed air from a compressor of the gas turbine combined-cycle power plant at a first heat exchanger with working fluid heated by the first external heat source, expanding the heated fluid through a turbine, generating electrical power with the turbine and condensing the fluid leaving the turbine with a liquid fuel regasification system.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIG. 6 is a line diagram illustrating steps of a method for operating the ORC system of FIG. 3.

Figure 1:
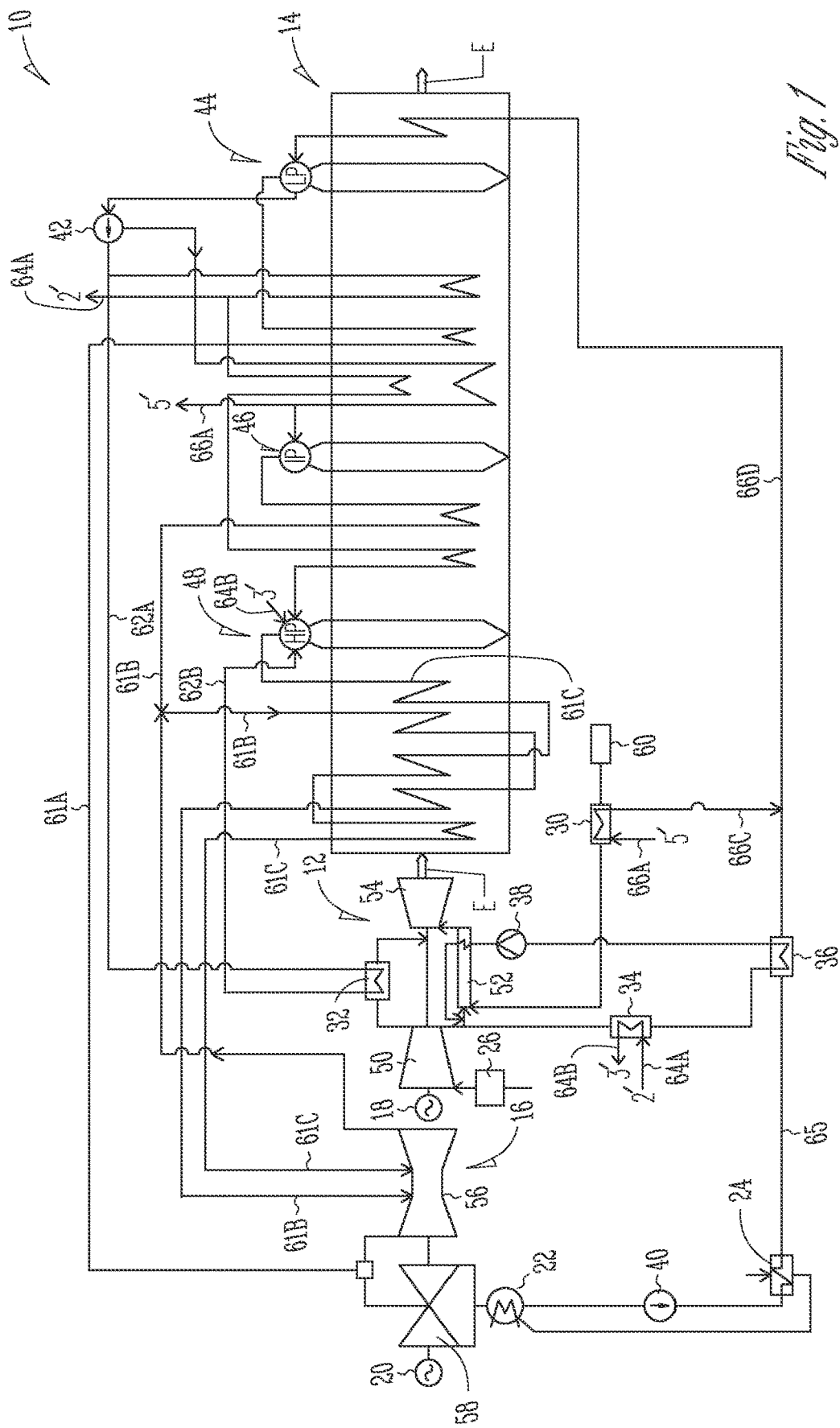
FIG. 1 is a schematic diagram illustrating a conventional Gas Turbine Combined Cycle (GTCC) power plant using water from a Heat Recovery Steam Generator (HRSG) as a cooling source for compressor air and seawater as a heat source for Liquified Natural Gas (LNG).

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram illustrating conventional Gas Turbine Combined Cycle (GTCC) power plant 10 having gas turbine engine (GTE) 12, Heat Recovery Steam Generator (HRSG) 14 and steam turbine 16. GTE 12 can be used in conjunction with electrical generator 18, and steam turbine 16 can be used in conjunction with electrical generator 20. Power plant 10 can also include condenser 22 and gland steam condenser (GSC) 24, evaporative cooler 26, fuel gas heater 30, Turbine Cooling Air (TCA) cooler 32, Enhanced Cooling Air (ECA) coolers 34 and 36, enhanced cooling air compressor 38, condensate pump 40 and feedwater pump 42. HRSG 14 can include low pressure section 44, intermediate pressure section 46 and high pressure section 48. Condenser 22 can form part of a cooling system and can comprise a surface condenser with seawater once-through cooling. GTE 12 can include compressor 50, combustor 52 and turbine 54. Steam turbine 16 can include IP/HP spool 56 and LP spool 58.

As will be discussed in greater detail below with reference to FIG. 1, TCA cooler 32 and ECA coolers 34 and 36 can utilize water from HRSG 14 to cool compressed air extracted from compressor 50 to cool combustor 52 and turbine 54. As will be discussed in greater detail below with reference to FIGS. 2 and 3, cooling at TCA cooler 32 and ECA coolers 34 and 36 can be conducted with an ORC system of the present application instead of using water from HRSG 14.

Ambient air can enter compressor 50 through evaporative cooler 26. The compressed air is fed to combustor 52 and mixed with fuel from fuel source 60, which can be a source of natural gas or regasified LNG. The compressed air from compressor 50 is mixed with the fuel for combustion in combustor 52 to produce high energy gas for turning turbine 54. Rotation of turbine 54 is used to produce rotational shaft power to drive compressor 50 and electrical generator 18. Exhaust gas E is directed to HRSG 14, where exhaust gas E interacts with appropriate water/steam piping in high pressure section 48, intermediate pressure section 46 and low pressure section 44 to produce steam. The steam is routed IP/HP spool 56 and LP spool 58 of steam turbine 16 via steam lines 61C, 61B and 61A to produce rotational shaft power to operate electrical generator 20. Exhaust gas E can exit HRSG 14 utilizing any appropriate venting means, such as a stack. HRSG 14 can additionally include appropriate means for conditioning exhaust gas E to remove potentially environmentally hazardous materials. For example, HRSG 14 can include a Selective Catalytic Reduction (SCR) emissions reduction unit.

Water that is used in HRSG 14 can be used as a cooling source in TCA cooler 32 and ECA coolers 34 and 36. For example, water from low pressure section 44 can be supplied by feedwater pump 42 to TCA cooler 32 via line 62A and returned to high pressure section 48 via line 62B. Likewise, water from feedwater pump 42 can be supplied to ECA cooler 34 via line 64A, as is shown by arrows 2?-2', which can then be returned to high pressure section 48 via line 64B, as is shown by arrows 3'-3'. Water from GSC 24, via line 65, can also be provided to ECA cooler 36 to cool the compressed air.

Water from HRSG 14 can also be used to perform fuel heating at fuel gas heater 30 with water line 66A, as is shown by arrows 5'-5', and water can then be returned to low pressure section 44 via lines 66C and 66D.

The heat added to the water in TCA cooler 32 and ECA cooler 34 results in some efficiency benefit in producing more steam in HRSG 14. However, due to the upper temperature limits of the water in HRSG 14 mentioned above, there are limits to the effectiveness of TCA cooler 32 and ECA cooler 34 to create steam. In the present disclosure, ORC system 70 (FIG. 3) can be connected in thermal communication with hot compressed air of GTE 12 and low-temperature LNG from regasification system 72 (FIG. 3) to cool compressed air extracted from compressor 50.

Figure 2:
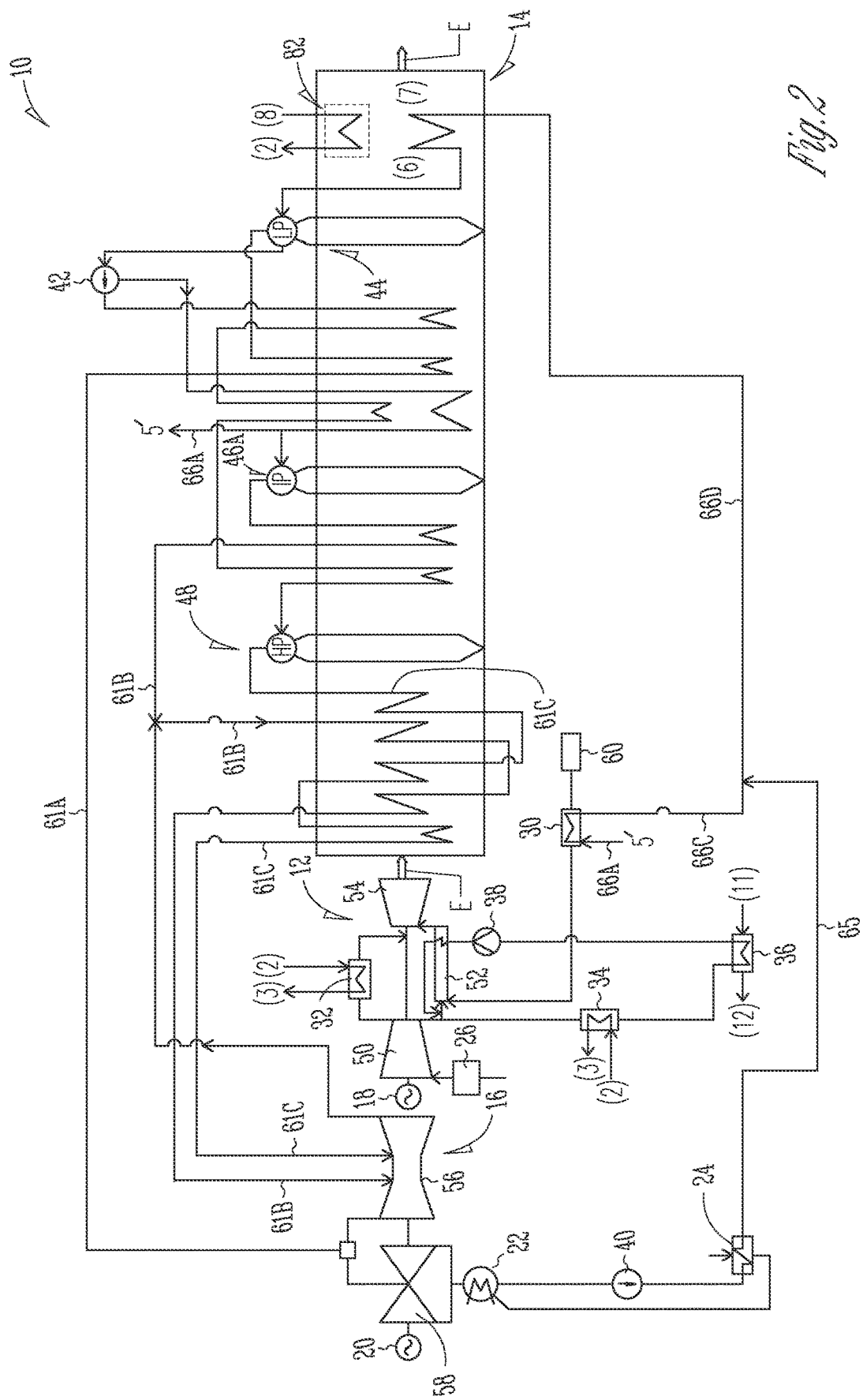
FIG. 2 is a schematic diagram illustrating a Gas Turbine Combined Cycle (GTCC) power plant of the present application having an ORC system using compressed air as a heat source, which can be used in conjunction with Liquified Natural Gas (LNG) as a cold sink.

FIG. 2 is a schematic diagram illustrating a Gas Turbine Combined. Cycle (GTCC) power plant 10 of FIG. 1 modified according to the present application to include ORC system 70 (FIG. 3) that uses compressed air as a heat source and Liquified Natural Gas (LNG) from regasification system 72 (FIG. 3) as a cold sink. FIG. 2 utilizes the same reference numbers where appropriate to indicate the same or functionally equivalent components as FIG. 1, and omits reference numbers where modification has resulted in removal of such component. New reference numbers are added to indicate additional components.

Figure 3:
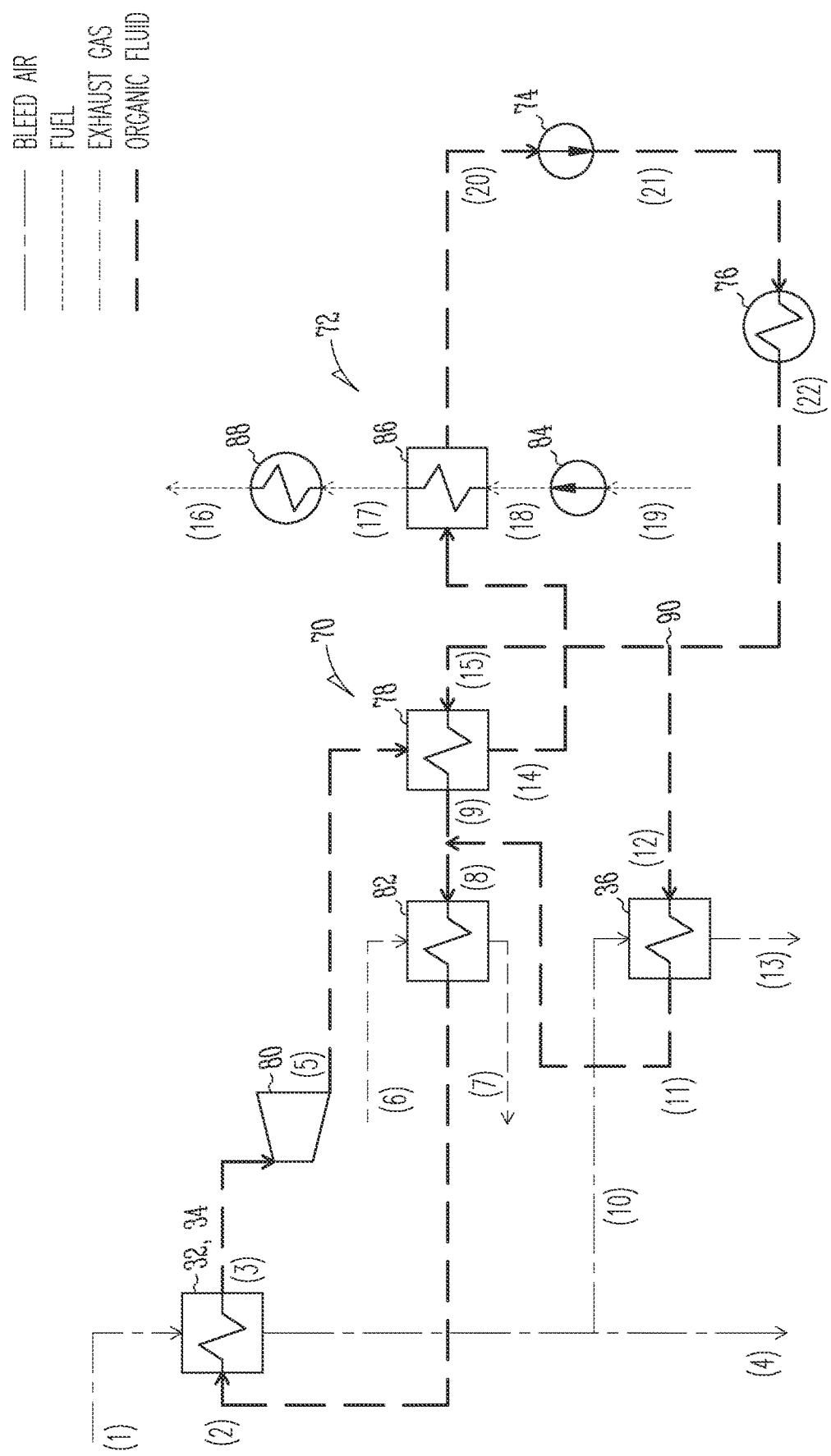
FIG. 3 is a schematic diagram illustrating the ORC system of FIG. 2.

In particular, lines 64A and 64B formed by arrows 2'-2' and 3'-3' for feeding and withdrawing water from ECA cooler 34 are removed, and replaced with lines (2) and (3). Lines 62A and 62B for feeding and withdrawing water from TCA cooler 32 are removed, and replaced with lines (2) and (3). In addition, water line 65 from GSC 24 is routed to bypass ECA cooler 36 and connect directly to line 66D. Instead of providing water to TCA cooler 32 and ECA coolers 34 and 36, a working fluid is provided from ORC system 70 using lines (2), (3), (11) and (12), which can be coupled in thermal communication with compressed air via a heat exchange section, as is indicated by lines (2), (3), (11) and (12) at ORC system 70. The working fluid can exchange heat with flue gas from HRSG 14 and LNG, as shown in FIG. 3. Lines (2), (3), (8), (11) and (12) refer to locations within ORC system 70 indicated in FIG. 3.

FIG. 3 is a schematic diagram illustrating ORC system 70 and re-gasification system 72. ORC system 70 can comprise TCA cooler 32, ECA coolers 34 and 36 (32 and 34 can be collectively referred to as a "first heat exchanger"; 36 can be referred to as a "second heat exchanger"), pump 74, heater 76, recuperator 78, turbine 80 and heat exchanger 82. Regasification system 72 can comprise pump 84, heat exchanger 86 and heater 88.

As compared to the system of FIG. 1, an additional heating surface is provided at heat exchanger 82 for ORC system 70 that can be arranged in parallel with the low temperature economizer (LTE) zone of HRSG 14 at low pressure section 44. Thus, exhaust gas E (or flue gas) of HRSG 14 can enter heat exchanger 82 at line (6) and can leave heat exchanger 82 at line (7). Working fluid of ORC system 70 can enter heat exchanger 82 at line (8) and can leave heat exchanger 82 at line (2). As a result, stack temperature of the system of FIG. 2 can be lower than a conventional GTCC power plant, such as that of FIG. 1, which, as discussed below, can be acceptable due to improved fuel quality of LNG fuel as LNG does not contain Sulphur.

In an embodiment, the working fluid of ORC system 70 can be ammonia ($NH_3$). Ammonia has the advantages of being nonflammable. However, in other embodiments, other fluids can be used. For example, various organic compounds can be used. In other embodiments, $CO_2$, hydro-carbon fluids and $H_2S$ can be used. Although other fluids may yield increased thermal efficiency, ammonia is commonly used in the industry.

Operation of ORC system 70 will be described with reference to FIG. 3 and use of ammonia as the working fluid. ORC system 70 can start at heat exchanger 86, which can function as a condenser for ORC system 70 and a regasifier for regasification system 72. At heat exchanger 86, the ammonia gas can be condensed to liquid and can flow into ammonia pump 74 at (20). The liquid ammonia can be pumped to a higher pressure at (21) and then preheated to a higher temperature using heater 76 at (22). Heater 76 can include an external heat source from an external system, such as an industrial or commercial process. The liquid ammonia can then be split into two portions at juncture 90. In an embodiment, the majority of the ammonia is heated in recuperator 78 between (15) and (9). The balance of the ammonia can be heated via heat from ECA cooler 36 from (12) to (11). Cooling air from compressor 50 (FIG. 2) can flow into ECA cooler 36 (through ECA 34) between (10) and (13). The two ammonia streams can be combined at (8) and further heated by heat exchanger 82 from (8) to (2). Heat exchanger 82 can be positioned within HRSG 14 and can be heated with exhaust gas E from HRSG 14 from (6) to (7). Cooling air from compressor 50 flowing from (1) to (4) can be used to finally heat the ammonia in both of TCA cooler 32 and ECA cooler 34 from (2) to (3). Thus, coolers 32 and 34 can comprise an ammonia superheater. Thus, the ammonia at (3), is at a higher pressure and temperature for entering turbine 80 (also referred to herein as an "ORC turbine"). Turbine 80 can be used for power generation, such as by coupling an electric generator to an output shaft of turbine 80. Ammonia gas exhausted from turbine 80 can be cooled in recuperator 78 from (5) to (14) and then condensed in heat exchanger 86, which can function as an ammonia condenser to return the ammonia to its initial state at (20).

LNG at (19) can be pumped to a higher pressure at (18) using pump 84 for matching the natural gas pressure of combustor 52 of gas turbine 12 (FIG. 2). The LNG can be gasified in heat exchanger 86 between (18) and (17), and finally heated in heater 88 from (17) to (16). After heater 88, the re-gasified LNG or natural gas can continue to combustor 52 (FIG. 2) for combustion.

Heater 88 can comprise a LNG trim heater or heat from an external system, such as an industrial or commercial process. The heat source for heater 88 can be from a steam turbine exhaust cooling condenser, such as condenser 22. Alternatively, the low temperature fuel gas (17) can provide cooling energy to a cooling user, such as a food storage facility if available. Similarly, liquid ammonia at (21) can be at a low temperature and can either be preheated in a steam turbine exhaust cooling condenser or provide cooling energy to another user.

The operation of GTCC power plant 10 and ORC system 70 can be modeled with software, and in an example was modeled with Ebsilon software. An exemplary power plant may include a 1-on-1 GTCC power plant which was based on an advanced-class gas turbine. The steam bottoming cycle is based on a typical HRSG arrangement which features three pressure levels (HP, IP and LP) with reheat. The simulation was based on ISO ambient conditions: 1.013 bar, dry bulb temperature of 15° C., and relative humidity of 60%. It was assumed that LNG consists of pure methane ($CH_4$).

Two cases were simulated. In the first Base Case, a conventional GTCC power plant 10 of FIG. 1 was simulated using methane fuel. In the second Improved Case, a modified GTCC power plant 10 of FIG. 2 was simulated using LNG fuel, ORC system 70, and regasification system 72. The simulation results indicated that a 1.4% net output increase and a 0.86% points plant net efficiency (LHV) increase can be achieved.

Compared to the Base Case (FIG. 1), steam turbine output of the Improved Case can potentially be lowered because steam production at intermediate pressure section 46 and low pressure section 44 in HRSG 14 are reduced as the HP feedwater is no longer heated by the GT cooling air. However, ORC system 70 can generate additional output at turbine 80 for the Improved Case (FIG. 2). This additional output provides the Improved Case with an overall, total power output greater than the Base Case. As a result, plant net efficiency can increase by 0.86% points for the Improved Case.

The simulation also found that the TCA/ECA cooler duties and LNG evaporation duty potentially do not match for the selected ORC, as TCA/ECA cooler duties can be significantly larger. In an example, the simulation of ORC system 70 in this study was carried out based on cooling air of one GT with the LNG quantity requirement of two GTs, which means that, for the particular system modeled, the performance of only one of two power trains was improved by application of ORC system 70. In such a scenario, the other GT can utilize compressed air cooling of the turbine and combustor with conventional TCA/ECA coolers.

In the Improved Case of the present application, the stack temperature of HRSG 14 can be lower than a conventional combined cycle. For the simulated cases, the stack temperature can be reduced to about 53° C. Although this is lower than a typical minimum stack temperature, such a temperature is acceptable because: A) LNG is considered as being a "Sulphur free" fuel, so concern related to the flue gas dewpoint is mitigated; and B) it is still higher than minimum flue gas temperature for discharging to the stack with adequate buoyancy (50° C., typical).

Figure 4:
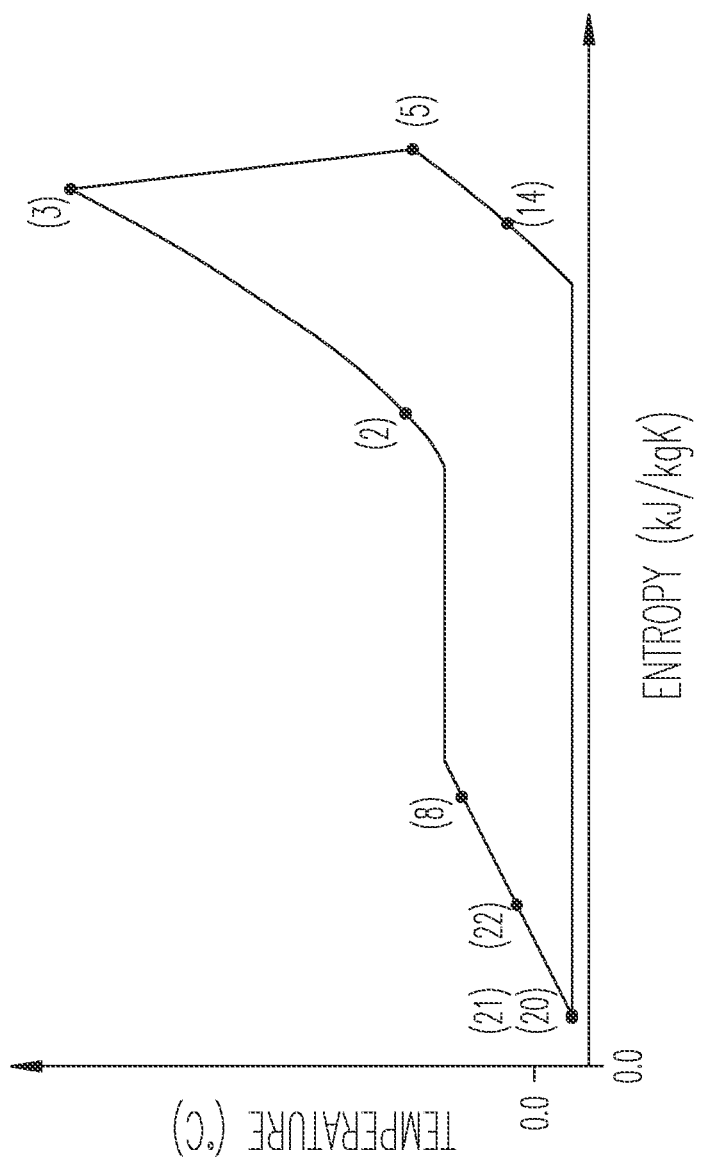
FIG. 4 is a graph showing a temperature-entropy (T-s) diagram of the ORC system of FIG. 3.

FIG. 4 is a graph showing a temperature-entropy (T-s) diagram of ORC system 70 of FIG. 3. FIG. 4 indicates that a subcritical Rankine power cycle is achieved. Both the inlet and outlet of turbine 80 (FIG. 3) are at "dry" (superheated) conditions, as is indicated by the location of point (5). Point (5) is located further to the right of FIG. 4 compared to conventional systems. Such conditions are beneficial for turbine operation. Operation of turbine 80 in dry conditions is benefitted by avoiding gas that includes liquid, which can damage the turbine blades.

Figure 5:
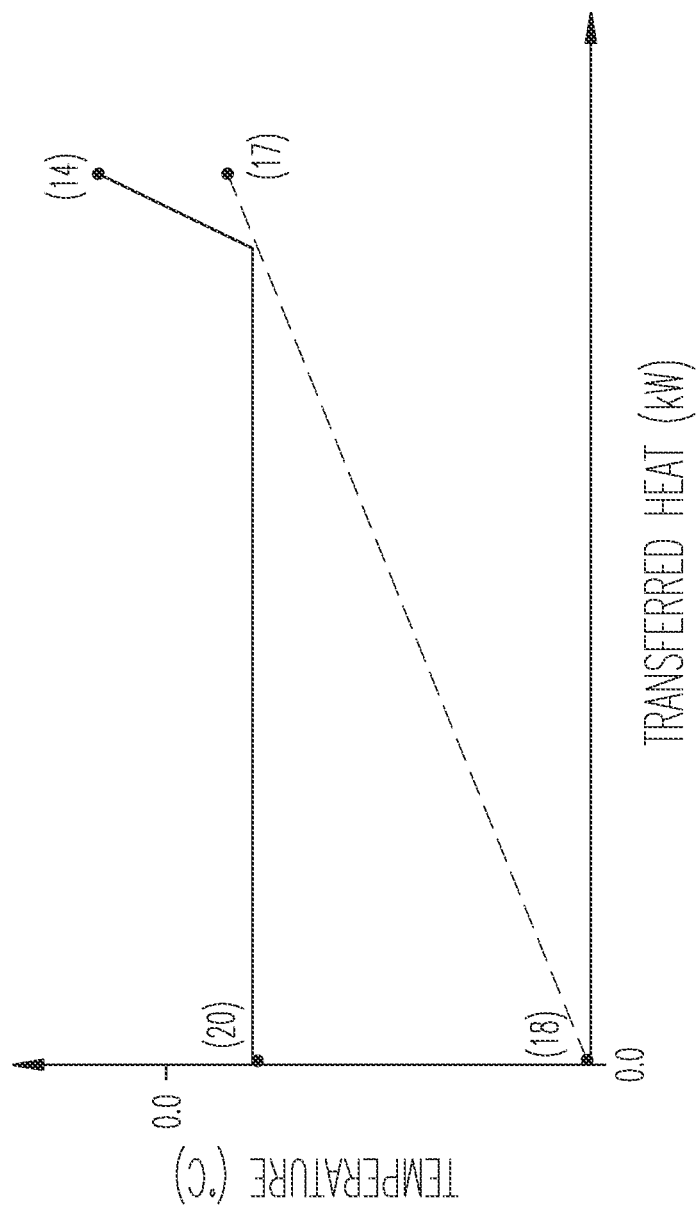
FIG. 5 is a graph showing a temperature profile of a condenser/regasifier of the ORC system of FIG. 3.

FIG. 5 is a graph showing a temperature profile of heat exchanger 86 of ORC system 70 of FIG. 3. FIG. 5 shows a temperature profile of the ammonia condenser/LNG regasifier represented by heat exchanger 86. FIG. 5 indicates that the temperature difference between the hot side ($NH_3$) and the cold side (LNG) is much bigger than a typical steam condenser of a thermal power plant, while the Terminal Temperature Difference is satisfied. Phase change (condensation of NH$_3$) happens in the hot side of the condenser. These factors result in smaller heat transfer surface area. The atmospheric pressure at hot side (against vacuum pressure for conventional steam condenser) allows use of a smaller size of the NH$_3$ condenser. Consequently, the NH$_3$ condenser can be compact and less expensive.

FIG. 6 is a line diagram illustrating steps of method 100 for operating ORC system 70 of FIG. 3. At step 102, an organic working fluid can be circulated through a closed-circuit loop using a pump, such as pump 74. At step 104, organic working fluid leaving the pump 74 can be heated by a heat exchanger 76 using an external heat source, such as a heat source from another system.

At step 106, a first stream of organic working fluid heated by the external heat source can be heated using a recuperator, such as a recuperator 78. At step 108, a second stream of organic working fluid heated by the external heat source can be heated using compressed air extracted from a compressor of a thereby cooling the compressed air. The cooled compressed air at this point can be sent to the combustor of the GTE. At step 110, organic working fluid from the first and second streams can be heated in a heat exchanger, such as heat exchanger 82 using heat from exhaust gas or flue gas of a heat recovery steam generator, such as HRSG 14. At step 112, organic working fluid from heat exchanger 82 can be heated using compressed air extracted from a compressor of a GTE, thereby cooling the compressed air. The cooled compressed air at this point can be sent to the turbine section of the GTE with a portion to be further cooled for sending to combustor of GTE.

At step 114, organic working fluid can be expanded in a turbine, such as ORC turbine 80, to decompress and cool the working fluid. At step 116, turbine 80 can be used to generate electricity, such as by turning the shaft of an electrical generator. At step 118, organic working fluid can be further cooled in recuperator 78. At step 120, organic working fluid can be additionally cooled in a condenser, such as condenser 86. Organic working fluid can be returned to pump 74 at step 102 to recirculate the organic working fluid through the closed loop and continue ORC operation.

At step 122, cold liquefied natural gas can be pumped using a pump, such as pump 84, to a heat exchanger 86. At step 124, heat exchanger 86 can be used to heat the liquid fuel using heat from the organic working fluid of ORC system 70. At step 126, the re-gasified LNG or natural gas can be further heated using, for example, trim heater 88 or heat from an external system. At step 128, the heated natural gas can then be conveyed to a combustor of a GTE.

The systems and methods of the present application result in a significant performance improvement that can be achieved by application of an ORC in a LNG-fueled GTCC power plant. In addition, an environmental benefit can be achieved by avoiding the cooling of seawater in the LNG regasification process.

In the systems and methods of the present application, the TCA cooler and the ECA coolers can be redesigned to address the specific parameters for use with organic working fluids such as ammonia. In addition, the organic working fluid is heated to even higher temperature than the HP feed water for the Base Case, and heat exchangers used in ORC system 70 can be designed accordingly. Likewise, equipment of ORC system 70, such as turbine 80 can be custom designed.

VARIOUS NOTES & EXAMPLES

Example 1 can include or use subject matter such as a gas turbine combined-cycle power plant that can comprise a gas turbine engine, a heat recovery steam generator, a steam turbine, a fuel regasification system and an Organic Rankine Cycle (ORC) system. The gas turbine engine can comprise a compressor for generating compressed air, a combustor that can receive a fuel and the compressed air to produce combustion gas, and a turbine for receiving the combustion gas and generating exhaust gas. The heat recovery steam generator can be configured for generating steam from water utilizing heat from the exhaust gas. The steam turbine can be configured for producing power from steam from the heat recovery steam generator. The fuel regasification system can be configured for converting the fuel from a liquid to a gas before entering the combustor. The ORC system can be configured to cool compressed air extracted from the compressor to cool the gas turbine engine, and heat liquid fuel entering the fuel regasification system.

Example 2 can include, or can optionally be combined with the subject matter of Example 1, to optionally include an Organic Rankine Cycle (ORC) system that comprises a fluid pump for pumping a fluid, a heater for heating the fluid pumped by the fluid pump, an ORC turbine for expanding the fluid heated in the heater, and a first heat exchanger positioned between the heater and the ORC turbine to heat the fluid with the compressed air extracted from the compressor.

Example 3 can include, or can optionally be combined with the subject matter of one or any combination of Examples 1 or 2 to optionally include a recuperator that can be positioned between the fluid pump and the first heat exchanger to exchange heat between the fluid entering the ORC turbine and the fluid leaving the ORC turbine.

Example 4 can include, or can optionally be combined with the subject matter of one or any combination of Examples 1 through 3 to optionally include a flue gas heater positioned between a recuperator and the first heat exchanger.

Example 5 can include, or can optionally be combined with the subject matter of one or any combination of Examples 1 through 4 to optionally include a second heat exchanger positioned in parallel with a recuperator.

Example 6 can include, or can optionally be combined with the subject matter of one or any combination of Examples 1 through 5 to optionally include fluid comprising ammonia.

Example 7 can include, or can optionally be combined with the subject matter of one or any combination of Examples 1 through 6 to optionally include a cooling source that can comprise a fuel regasification system.

Example 8 can include, or can optionally be combined with the subject matter of one or any combination of Examples 1 through 7 to optionally include a fuel regasification system that comprises a fuel pump for receiving liquefied fuel, a heat exchanger for receiving liquid fuel from the fuel pump, the heat exchanger configured to function as a condenser for the Organic Rankine Cycle system, a trim heater for heating gasified fuel from the heat exchanger.

Example 9 can include, or can optionally be combined with the subject matter of one or any combination of Examples 1 through 8 to optionally include liquefied fuel comprising liquified natural gas.

Example 10 can include or use subject matter such as an Organic Rankine Cycle (ORC) system for operation with a gas turbine combined-cycle power plant can comprise a fluid pump for pumping a fluid, a heater for heating the fluid pumped by the fluid pump, an ORC turbine for expanding the fluid heated in the heater, a first heat exchanger positioned between the heater and an inlet of the ORC turbine to heat the fluid with compressed air extracted from a compressor of the gas turbine combined-cycle power plant, and a regasification system for a fuel configured to cool the fluid between an outlet of the ORC turbine and an inlet of the pump.

Example 11 can include, or can optionally be combined with the subject matter of Example 10, to optionally include a recuperator positioned between an outlet of the pump and an inlet of the first heat exchanger to exchange heat between the fluid entering the ORC turbine and the fluid leaving the ORC turbine.

Example 12 can include, or can optionally be combined with the subject matter of one or any combination of Examples 10 or 11 to optionally include a flue gas heater that can be positioned between the recuperator and the inlet of the first heat exchanger.

Example 13 can include, or can optionally be combined with the subject matter of one or any combination of Examples 10 through 12 to optionally include a second heat exchanger that can be positioned in parallel with the recuperator relative to output of the pump.

Example 14 can include, or can optionally be combined with the subject matter of one or any combination of Examples 10 through 13 to optionally include a fuel regasification system that can comprise: a fuel pump for receiving liquefied fuel, a heat exchanger for receiving liquid fuel from the fuel pump and fluid from an outlet of the recuperator, and a trim heater for heating gasified fuel from the heat exchanger.

Example 15 can include, or can optionally be combined with the subject matter of one or any combination of Examples 10 through 14 to optionally include a heat exchanger of the fuel regasification system that can be configured as a condenser for the fluid and a regasifier for the liquefied fuel.

Example 16 can include or use subject matter such as a method of operating a gas turbine combined-cycle power plant that can comprise circulating a working fluid through a closed loop using a working pump, heating the working fluid with a first external heat source, cooling compressed air from a compressor of the gas turbine combined-cycle power plant at a first heat exchanger with working fluid heated by the first external heat source, expanding the heated working fluid through a turbine, generating electrical power with the turbine, and condensing the working fluid leaving the turbine with a liquid fuel regasification system.

Example 17 can include, or can optionally be combined with the subject matter of Example 16, to optionally include heating the working fluid with a first external heat source by heating the working fluid with a preheater.

Example 18 can include, or can optionally be combined with the subject matter of one or any combination of Examples 16 or 17 to optionally include cooling the working fluid leaving the turbine with a recuperator.

Example 19 can include, or can optionally be combined with the subject matter of one or any combination of Examples 16 through 18 to optionally include cooling the compressed air from the compressor of the gas turbine combined-cycle power plant at a second heat exchanger upstream of the first heat exchanger.

Example 20 can include, or can optionally be combined with the subject matter of one or any combination of Examples 16 through 19 to optionally include cooling the fluid leaving the turbine with a liquid fuel regasification system by pumping liquefied natural gas with a fuel pump through a regasifier heat exchanger in thermal communication with the working fluid upstream of the working pump, heating the liquefied natural gas in the heat exchanger to gasify the liquefied natural gas and condense the working fluid, heating the gasified natural gas with a trim heater, and providing the gasified natural gas to a gas turbine of the gas turbine combined-cycle power plant.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A closed loop Organic Rankine Cycle (ORC) system for operation with a gas turbine combined-cycle power plant, the closed loop ORC system comprising:
    a fluid pump for pumping an organic fluid;
    a first fluid line connected to an outlet of the fluid pump;
    a heater for receiving the organic fluid from the first fluid line and heating the organic fluid pumped by the fluid pump;
    a second fluid line extending from the heater to a first fluid juncture;
    a third fluid line extending from the first fluid juncture to a heat sink input side of a recuperator, a first portion of the pumped organic fluid flowing through the third fluid line;
    a fourth fluid line extending from the first fluid juncture, a second portion of the pumped organic fluid flowing through the fourth fluid line to a heat sink input side of a second heat exchanger;
    a fifth fluid line extending from a heat sink output side of the recuperator to a second fluid juncture, the first portion of the pumped organic fluid flowing from the third fluid line to the fifth fluid line;
    a sixth fluid line extending from a heat sink output side of the second heat exchanger to the second fluid juncture, the second portion of the pumped organic fluid flowing from the fourth fluid line to the sixth fluid line;
    a seventh fluid line extending from the second fluid juncture to a heat sink input side of a first heat exchanger, the first and second portions of the pumped organic fluid flowing through the seventh fluid line;
    a first compressed air line connected to a heat source input side of the first heat exchanger, the first compressed air line delivering compressed air extracted from a compressor of the gas turbine combined-cycle power plant to the first heat exchanger;
    a second compressed air line extending from a heat source output side of the first heat exchanger, the pumped organic fluid flowing through the first heat exchanger heated by the compressed air flowing through the first heat exchanger, heated pumped organic fluid flows out of the heat sink output side of the first heat exchanger and cooled compressed air flows out of the heat source output side of the first heat exchanger and into the second compressed air line;
    a third compressed air line extends from the second compressed air line to a heat source input side of the second heat exchanger, a portion of the cooled compressed air from the second compressed air line is further cooled by heating the second portion of the pumped organic fluid flowing through the second heat exchanger;
    an eighth fluid line extending from the heat sink output side of the first heat exchanger and transporting the heated pumped organic fluid;
    an ORC turbine for receiving the heated pumped organic fluid from the eighth fluid line and expanding the heated pumped organic fluid heated in the first heat exchanger;
    a ninth fluid line extending from the ORC turbine to a heat source input side of the recuperator;
    a tenth fluid line extending from a heat source output side of the recuperator to an organic fluid input side of a condenser;
    an eleventh fluid line extending from an organic fluid output side of the condenser to an inlet of the fluid pump; and
    a fuel regasification system comprising:
        a fuel pump for receiving a liquefied fuel, the liquefied fuel pumped to a liquefied fuel input side of the condenser, the liquefied fuel converted to gasified fuel in the condenser by receiving heat from the organic fluid; and
        a fuel line extending from a gasified fuel output side of the condenser to a trim heater for heating gasified fuel from the condenser.

2. The closed loop Organic Rankine Cycle (ORC) system for operation with the gas turbine combined-cycle power plant of claim 1 further comprising:
    a gas turbine engine comprising:
        a compressor for generating compressed air;
        a combustor that can receive a fuel and the compressed air to produce combustion gas; and
        a turbine for receiving the combustion gas and generating exhaust gas;
    a heat recovery steam generator for generating steam from water utilizing heat from the exhaust gas; and
    a steam turbine for producing power from steam from the heat recovery steam generator.

3. The closed loop Organic Rankine Cycle (ORC) system for operation with the gas turbine combined-cycle power plant of claim 1, wherein the organic fluid comprises ammonia.

4. The closed loop Organic Rankine Cycle (ORC) system for operation with the gas turbine combined-cycle power plant of claim 1, wherein the liquefied fuel comprises liquified natural gas.

5. The closed loop Organic Rankine Cycle system of claim 1, further comprising a flue gas heater positioned in the seventh fluid line between the recuperator and the heat sink input side of the first heat exchanger.

6. The closed loop Organic Rankine Cycle system of claim 1, wherein the condenser is configured to condense the organic fluid received from the tenth fluid line into a liquid organic fluid delivered to the eleventh fluid line.

7. A method of operating a gas turbine combined-cycle power plant, the method comprising:
    circulating an organic fluid through a closed loop Organic Rankine Cycle (ORC) system using a fluid pump;
    pumping the organic fluid through a first fluid line connected to an outlet of the fluid pump;
    heating the organic fluid received from the first fluid line in a heater with a first external heat source;

flowing the heated organic fluid from the heater through a second fluid line extending from the heater to a first fluid juncture;
splitting the heated organic fluid at the first fluid juncture into a first portion and a second portion;
flowing the first portion of the heated organic fluid through a third fluid line extending from the first fluid juncture to a heat sink input side of a recuperator;
flowing the second portion of the heated organic fluid through a fourth fluid line extending from the first fluid juncture to a heat sink input side of a second heat exchanger;
flowing the first portion of the heated organic fluid from the heat sink input side of the recuperator to a heat sink output side of the recuperator to further heat the first portion of the heated organic fluid,
flowing the first portion of the heated organic fluid through a fifth fluid line extending from the heat sink output side of the recuperator to a second fluid juncture
flowing the second portion of the heated organic fluid from the heat sink input side of the second heat exchanger to a heat sink output side of the second heat exchanger to further heat the second portion of the heated organic fluid,
flowing the second portion of the heated organic fluid through a sixth fluid line extending from the heat sink output side of the second heat exchanger to the second fluid juncture;
flowing the first and second portions of the heated organic fluid through a seventh fluid line extending from the second fluid juncture to a heat sink input side of a first heat exchanger, the first and second portions of the heated organic fluid forming a combined organic fluid;
flowing the combined organic fluid from the heat sink input side of the first heat exchanger to a heat sink output side of the first heat exchanger;
delivering a compressed air stream from a compressor of the gas turbine combined-cycle power plant to a heat source input side of the first heat exchanger via a first compressed air line;
cooling the compressed air stream by flowing the compressed air stream from the heat source input side of the first heat exchanger to a heat source output side of the first heat exchanger, the combined organic fluid absorbing heat from the compressed air stream resulting in a heated combined organic fluid at the heat sink output side of the first heat exchanger and a cooled compressed air stream at the heat source output side of the first heat exchanger;
flowing the cooled compressed air stream from the heat source output side of the first heat exchanger into a second compressed air line that transports the cooled compressed air;
flowing a portion of the cooled compressed air from the second compressed air line into a third compressed air line that extends from the second compressed air line to a heat source input side of the second heat exchanger to further cool the portion of the cooled compressed air by heating the second portion of the pumped organic fluid flowing through the second heat exchanger;
flowing the heated combined organic fluid from the heat sink output side of the first heat exchanger into an eighth fluid line that extends to an input end of an ORC turbine;
expanding the heated combined organic fluid working fluid through the ORC turbine resulting in expanded organic fluid at an outlet end of the ORC turbine;
generating electrical power with the ORC turbine;
flowing the expanded organic fluid from the outlet end of the ORC turbine into a ninth fluid line extending from the outlet end of the ORC turbine to a heat source input side of the recuperator;
flowing the expanded organic fluid from a heat source output side of the recuperator into a tenth fluid line that extends to an organic fluid input side of a condenser;
condensing the expanded organic fluid entering the organic fluid input side of the condenser as a gas and leaving an organic fluid output side of the condenser as a liquid organic fluid by using liquefied natural gas as a heat sink fluid; and
returning the liquid organic fluid to the fluid pump by flowing the liquid organic fluid through an eleventh fluid line extending from the organic fluid output side of the condenser to an inlet of the fluid pump.

8. The method of claim 7, wherein condensing the expanded organic fluid entering the organic fluid input side of the condenser as a gas further comprises:
pumping the liquefied natural gas with a fuel pump to a heat sink input side of the condenser;
heating the liquefied natural gas flowing through the condenser from the heat sink input side to a heat sink output side to gasify the liquefied natural gas by receiving heat from the organic fluid and condensing the expanded organic fluid entering the organic fluid input side of the condenser as a gas and leaving the organic fluid output side of the condenser as the liquid organic fluid;
flowing the gasified natural gas through a fuel line extending from the heat sink output side of the condenser to a trim heater;
heating the gasified natural gas with the trim heater; and
providing the gasified natural gas to a gas turbine of the gas turbine combined-cycle power plant.

\* \* \* \* \*